United States Patent
Schrüfer et al.

(10) Patent No.: US 11,073,029 B2
(45) Date of Patent: Jul. 27, 2021

(54) CONSTRUCTION ELEMENT HAVING A BOND STRUCTURE FOR A TURBO ENGINE, METHOD FOR THE PRODUCTION OF A CONSTRUCTION ELEMENT HAVING A BOND STRUCTURE FOR A TURBO ENGINE, AND TURBO ENGINE HAVING A CONSTRUCTION ELEMENT HAVING A BOND STRUCTURE

(71) Applicants: Rolls-Royce Deutschland Ltd & Co KG, Blankenfelde-Mahlow (DE); Forschungszentrum Juelich GmbH, Jülich (DE)

(72) Inventors: Susanne Schrüfer, Zossen (DE); Robert Vassen, Herzogenrath (DE); Daniel E. Mack, Cologne (DE); Martin Tandler, Viersen (DE); Frank Kurze, Linnich (DE)

(73) Assignees: Rolls-Royce Deutschland Ltd & Co KG, Blankenfelde-Mahlow (DE); Forschungszentrum Juelich GMBH, Juelich (DE)

( * ) Notice: Subject to any disclaimer, the term of this patent is extended or adjusted under 35 U.S.C. 154(b) by 0 days.

(21) Appl. No.: 16/538,330

(22) Filed: Aug. 12, 2019

(65) Prior Publication Data

US 2020/0049018 A1   Feb. 13, 2020

(30) Foreign Application Priority Data

Aug. 13, 2018   (DE) .................... 10 2018 119 608.3

(51) Int. Cl.
| | | |
|---|---|---|
| *B32B 3/00* | (2006.01) | |
| *F01D 5/28* | (2006.01) | |
| *C09D 1/00* | (2006.01) | |

(52) U.S. Cl.
CPC ............. *F01D 5/288* (2013.01); *C09D 1/00* (2013.01); *F05D 2230/90* (2013.01); *Y10T 428/24917* (2015.01)

(58) Field of Classification Search
None
See application file for complete search history.

(56) References Cited

U.S. PATENT DOCUMENTS

| | | | |
|---|---|---|---|
| 5,683,761 A | 11/1997 | Bruce et al. | |
| 6,764,771 B1 * | 7/2004 | Heimberg | F01D 5/288 428/472 |

(Continued)

FOREIGN PATENT DOCUMENTS

| | | |
|---|---|---|
| DE | 10248093 A1 | 4/2003 |
| DE | 102005050873 A1 | 4/2007 |

(Continued)

OTHER PUBLICATIONS

European Search Report dated Dec. 12, 2019 from counterpart European Patent Application No. EP19186673.0.

(Continued)

*Primary Examiner* — Seth Dumbris
(74) *Attorney, Agent, or Firm* — Shuttleworth & Ingersoll, PLC; Timothy Klima

(57) ABSTRACT

A construction element, particularly adapted and configured for use in a turbo engine, in particular an aircraft engine, wherein a bond coat having a bond structure and thereabove a ceramic coat are disposed on a base. The lateral faces of the bond structure in the cross section are configured so as to be free of undercuts, wherein peak structures and/or trough structures are present, and the peak of the cross section of a peak structure has a mean peak angle (α) of less (Continued)

than or equal to 90°, most particularly less than 45°, and/or the trough structure has a valley angle in the range $90° \leq \beta < 170°$.

19 Claims, 8 Drawing Sheets

(56) References Cited

U.S. PATENT DOCUMENTS

| | | | |
|---|---|---|---|
| 2003/0085203 A1 | 5/2003 | Nair et al. | |
| 2005/0276688 A1 | 12/2005 | Roth-Fagaraseanu et al. | |
| 2008/0145694 A1 | 6/2008 | Bucci | |
| 2010/0158680 A1* | 6/2010 | Kirby | F01D 5/288 |
| | | | 415/200 |
| 2012/0213659 A1 | 8/2012 | Bayer et al. | |
| 2013/0122259 A1* | 5/2013 | Lee | B32B 3/30 |
| | | | 428/164 |
| 2013/0157000 A1 | 6/2013 | Roth-Fagaraseanu et al. | |
| 2014/0023482 A1* | 1/2014 | Wada | C23C 28/345 |
| | | | 415/110 |
| 2015/0030826 A1 | 1/2015 | Kamel et al. | |
| 2015/0118444 A1* | 4/2015 | Lipkin | C04B 41/52 |
| | | | 428/164 |
| 2015/0240364 A1 | 8/2015 | Reiche et al. | |
| 2016/0369637 A1* | 12/2016 | Subramanian | F01D 9/023 |
| 2017/0073277 A1* | 3/2017 | Shim | C04B 41/52 |
| 2017/0122561 A1* | 5/2017 | Nagaraj | C23C 28/3215 |
| 2017/0216969 A1 | 8/2017 | Dietrich et al. | |
| 2018/0066527 A1 | 3/2018 | Kadau et al. | |

FOREIGN PATENT DOCUMENTS

| | | |
|---|---|---|
| DE | 102009051479 A1 | 5/2011 |
| DE | 102011085801 A1 | 5/2013 |
| DE | 102014207789 A1 | 10/2015 |
| DE | 112014003460 T5 | 5/2016 |
| DE | 102015222808 A1 | 5/2017 |
| DE | 102016207466 A1 | 11/2017 |
| EP | 1491658 A1 | 12/2004 |
| EP | 2687685 A2 | 1/2014 |
| EP | 3150741 A1 | 4/2017 |
| EP | 2885441 B1 | 8/2017 |

OTHER PUBLICATIONS

German Search Report dated May 6, 2019 for counterpart German Patent Application 10 2018 119 608.3.
European Office Action dated Sep. 29, 2020 from counterpart European Patent Application No. 19186673.0.

* cited by examiner

CONSTRUCTION ELEMENT HAVING A BOND STRUCTURE FOR A TURBO ENGINE, METHOD FOR THE PRODUCTION OF A CONSTRUCTION ELEMENT HAVING A BOND STRUCTURE FOR A TURBO ENGINE, AND TURBO ENGINE HAVING A CONSTRUCTION ELEMENT HAVING A BOND STRUCTURE

REFERENCE TO A RELATED APPLICATION

This application claims priority to German Patent Application No. 10 2018 119 608.3 filed on Aug. 13, 2018, the entirety of which is incorporated by reference herein.

BACKGROUND

The disclosure relates to a construction element having a bond structure for turbo engines, to a method for the production of a construction element having a bond structure for a turbo engine, and to a turbo engine having a construction element having a bond structure.

Very high operating temperatures are reached in turbo engines such as, for example, aircraft engines or stationary steam or gas turbines. In excess of 2000 K can be reached in modern aircraft engines, for example. On account thereof, specific parts of the turbo engine such as, for example, combustion chambers or the intake region of the turbine in an aircraft engine, are subjected to very high thermal loads. Furthermore, these construction elements have additionally to resist high mechanical loads in particular when starting-up a turbine, since the tips of the turbine blades at least briefly come into contact with the turbine wall.

It is therefore known for specific parts of the turbo engine to be covered with a mechanically stable, heat-resistant, multi-layer coat. Such a multi-layer coating is known from EP 1 491 658 A1, for example. A so-called metallic bond-coat layer (adhesion promoting layer) is applied to a metallic substrate, a ceramic coat in turn being applied to said bond-coat layer. These two coats conjointly are also referred to as a thermal barrier coating (TBC). DE 10 2005 050 873 A1 and DE 10 2011 085 801 A1 relate to structured high-temperature coatings.

SUMMARY

It is therefore expedient for thermally and mechanically stable construction elements which are capable of being reliably connected to a high-temperature coating to be developed, wherein the production of the construction element has to be economical.

The object is achieved by a construction element having features as described herein.

The construction element has a base on which a bond coat having a bond structure is disposed. A ceramic coat is disposed on top of the bond coat.

The lateral faces of the bond structure in the cross section are configured so as to be free of undercuts, wherein peak structures and/or trough structures can be present.

The peak of the cross section of a peak structure has a mean peak angle $\alpha$ in the range $\alpha \leq 90°$, particularly $\alpha \leq 45°$. The trough structure has a valley angle $\beta$ in the range $90° \leq \beta < 170°$.

Free of undercuts means that the cross-sectional width of the bond structure decreases in a monotonous manner, particularly a steadily monotonous manner, to the peak. A peak structure has individual peaks protruding from a base area, or a tapering rib. A trough structure has individual depressions in a base area. In principle, it is possible for peak structures and trough structures to be combined with one another.

Such a bond structure can be produced from the bond coat in particular by an ablative laser machining method, this being more economical than a production by a laser deposition method, for example.

The height of the bond structure is measured from the surface of the bond coat from which the bond structure has been machined, for example. The height of the bond structure in the case of a trough structure herein is measured from the floor area. The ratio of the thickness of the bond coat to the height of the structure can thus be 0.1 to 10, particularly 0.3 to 3.

Additionally or alternatively, the ratio of the height of the bond structures to the mutual spacing of the bond structures in one embodiment can be in the range from 0.1 to 5, particularly between 0.3 and 3.

In one embodiment, the construction element can have a structured surface having a nominal roughness $R_a$ (mean roughness) between 5 μm and 25 μm.

Embodiments of the construction element can have bond structures as a linear structure, as a punctiform structure, as a mesh structure, as a honeycomb structure, and/or as a corrugated structure from mutually parallel-running corrugations. In principle it is possible for the forms of the structures to be combined with one another. For example, a linear structure and a punctiform structure can thus be combined with one another by superimposition. The bond structures herein can also follow complex surfaces. The height of the cross section of the bond structure along a spatial extent, for example in a linear mesh structure, of the bond structure can be substantially consistent so that a type of wall having a consistent height is present, for example.

The maximum height of the cross section of the bond structure at crossover points of the bond structure, particularly in a mesh structure, can vary, particularly as compared to the height of the bond structure outside the crossover points. For example, a mesh-type bond structure in which particularly high peaks or deep troughs can be present at the crossover points would thus be present.

In one embodiment, the mean spacing between peaks of the bond structure is between 50 and 5000 μm. In the case of a mesh structure, this would be the spacing between two rows of the mesh. The ratio of 0.1 to 5 for the height of the structures to the spacing of the structures is characteristic for the structures.

In one embodiment, the construction element has a bond structure having a substantially triangular cross section, particularly an isosceles triangular cross section. These cross sections, for example of linear bond structures in meshes, can be simply produced and offer a sufficiently large surface area for promoting bonding to the ceramic coat.

The width of the cross section of the bond structure herein can decrease uniformly from the surface of the bond coat to the peak. A uniform decrease in width can be understood to be, for example, a linear decrease (side of the triangle) or an exponential decrease in width. The decrease in width can also be composed of a sequence of segments (lines, arcuate segments) free of undercuts.

A particularly simple construction is present when the cross section of the bond structure is symmetrical to a perpendicular line through the peak of the bond structure or to the vertical central axis of the trough.

In one embodiment, the ratio of the height of the cross section to the width at the base of the bond structure can also be between 0.1 and 10, particularly between 1 and 5. The height of the cross section of the bond structure can also be between 50 and 500 μm, particularly between 70 and 150 μm. In principle, the dimensional indications are based on mean values.

Furthermore, in one embodiment the height of the cross section of the bond structure along the bond structure can be substantially consistent.

Embodiments can have a bond structure from a metallic and/or ceramic material, comprising a proportion of
M CrAlY where M=Fe, Ni, and/or Co,
M CrAl where M=Fe, Ni, and/or Co,
NiAl, or NiAlPt
yttrium-stabilized zirconium oxide (YSZ)
aluminate
pyrochlore and/or
perovskite.

The ceramic coat can comprise at least one oxidic ceramic, particularly containing magnesium spinel and/or aluminium oxide, particularly yttrium-stabilized zirconium oxide (YSZ), pyrochlores, or perovskites.

The object is also achieved by a method having features as described herein. A bond coat having a bond structure is applied to a base herein, and a ceramic coat is disposed thereabove.

The bond structure herein is generated by a laser ablation method so as to be free of undercuts.

The ceramic coat, particularly a YSZ coat and/or a magnesium spinel coat, can be applied by an atmospheric plasma spray method, for example.

Alternatively, a YSZ coat can be applied to the bond coat by an atmospheric plasma spray method, and a magnesium spinel coat can be applied thereabove by a suspension plasma spray method.

The object is also achieved by a turbo engine having features as described herein, wherein the construction element is configured as part of a combustion chamber, as part of a wall of a turbine, and/or is configured in the intake region of a high-pressure part of a turbine.

BRIEF DESCRIPTION OF THE DRAWINGS

The solution will be explained in conjunction with the embodiments illustrated in the figures.

DETAILED DESCRIPTION

Figure 1:
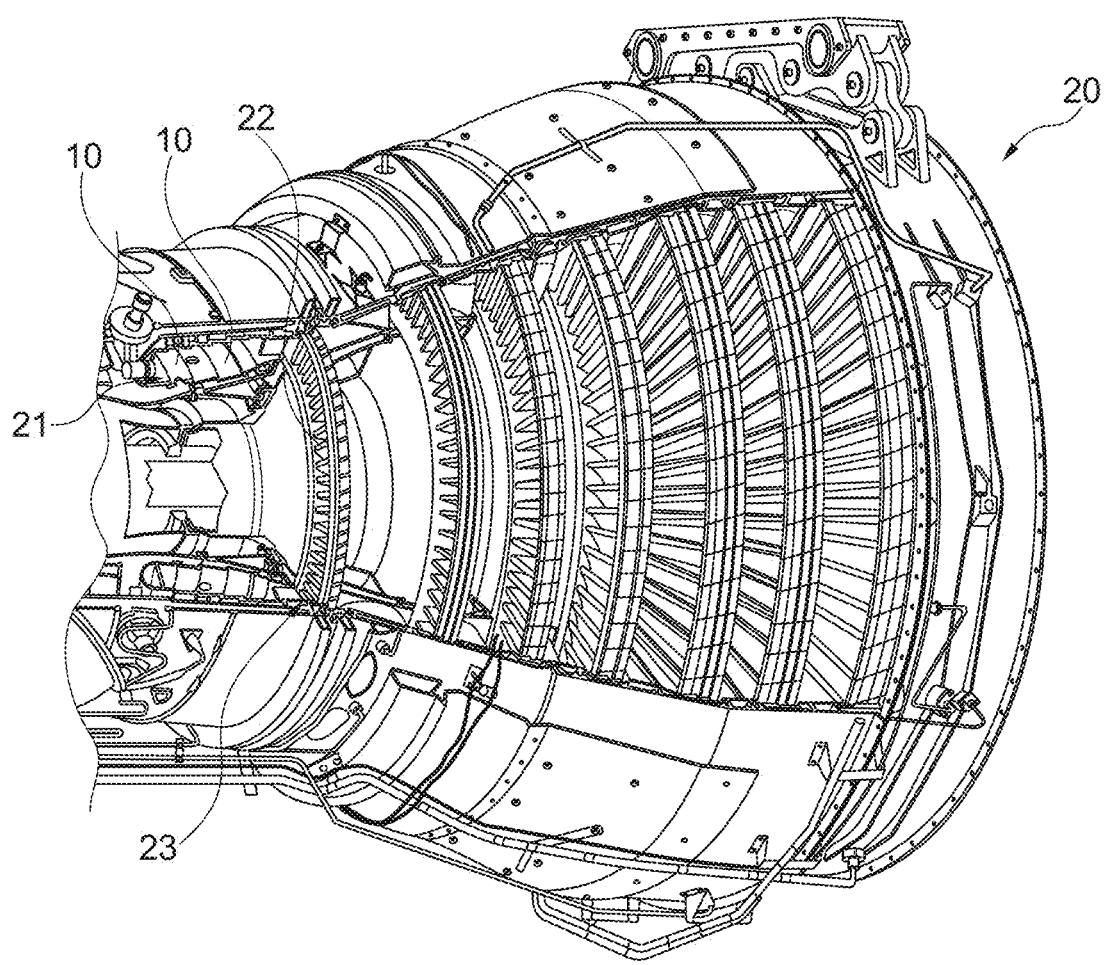
FIG. 1 shows an illustration of a part of an aircraft engine having a construction element having a bond structure.

An aircraft engine 20 as an exemplar of a turbo engine is illustrated in part in FIG. 1, temperature-resistant construction elements 10 (to be described hereunder) having a structured bond coat 2 (see FIG. 2 or 3, for example) being able to be used in said aircraft engine 20. The axially rear part of the aircraft engine 20 is illustrated here, that is to say that the compressor stages of the aircraft engine 20 are not illustrated.

Particularly high thermal loads are present in a combustion chamber 21. For this reason, plate-shaped construction elements 10 having a bond structure 4 (see FIG. 2 or 3, for example) can be disposed in the interior of the combustion chamber 21.

The highest temperature is present at the exit of the gases from the combustion chamber 21 and at the entry into a high-pressure stage 22 of the turbine. Additionally or alternatively construction elements 10 can therefore be disposed in the high-pressure stage 22. Said construction elements 10 herein are not configured as plates, but the coating is disposed directly in the region of the stator of the turbine, for example. The region of the stator per se thus becomes the coated construction element 10. In principle, it is also possible for the coated construction elements 10 to also have ducts or openings for cooling media.

It is furthermore also possible for blades of rotors and/or stators to be provided with the coating so that said blades become construction elements 10 in the context of the present description.

A further possibility lies in using the construction element 10 as a coating, that is to say as a so-called liner 23, in the wall of the turbine wall, that is to say particularly in those regions that are opposite the blades of the rotors. Liners 23 can be used in the regions in which rotor blades, for example of the turbine, are at least temporarily in mechanical contact with the wall of the casing. This is quite desirable at least for minimizing the gap between the wall and the turbine blade. The construction elements 10 having bond structures 4 and a ceramic coating 3 do not only have a high thermal load bearing capability, but in mechanical terms are also configured such that said construction elements 10 can be used as liners 23.

Liners 23 can also be used in combustion chambers, or the coating can become directly part of the combustion chamber wall.

In principle, the construction element 10 can be used at those locations where comparatively thick ceramic coats are usually disposed.

By way of the embodiments described here it is possible for a fine structuring to be applied directly to a bond coat material without compromising the metal base. Only minor thermal gradients within the construction elements 10 arise in operation. The adhesion of the bond coat on the base material 1 is also very positive. Said embodiments also have a high resistance to oxidation.

Figure 2:
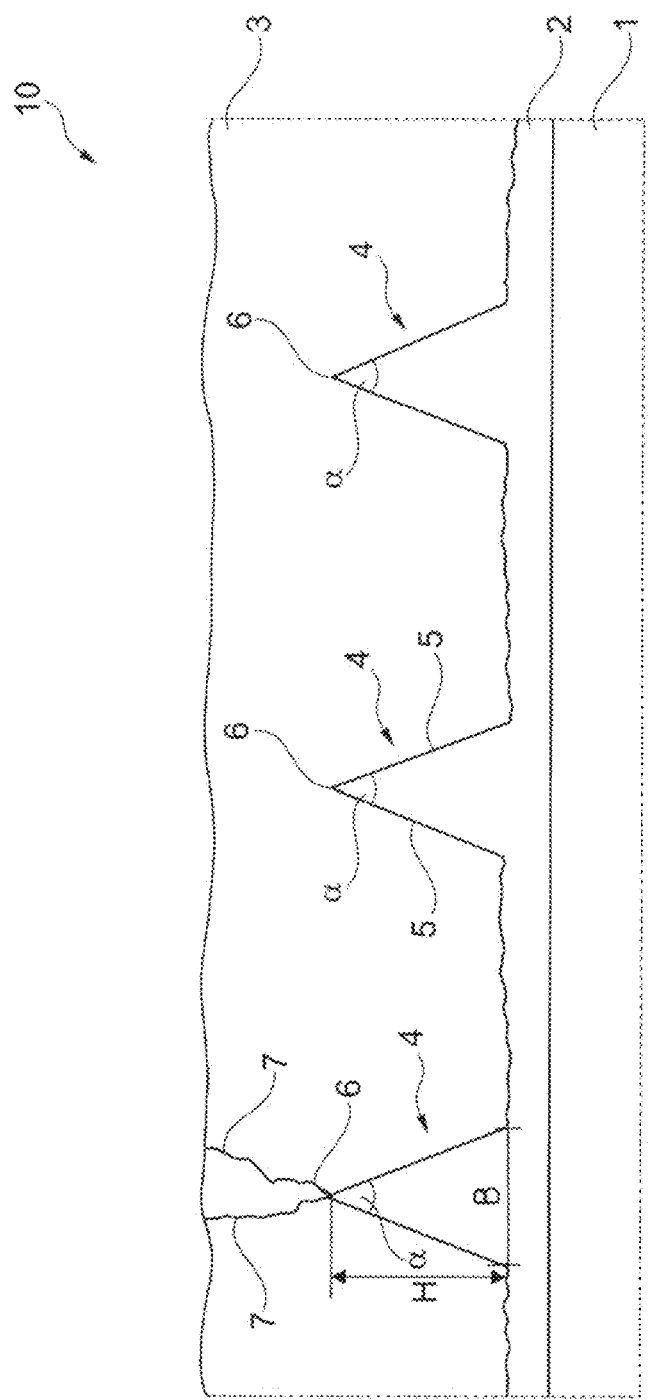
FIG. 2 shows a schematic sectional illustration through a first embodiment of a construction element having a bond structure having a peak structure.

A sectional view through the surface of an embodiment of a construction element 10 is schematically illustrated in FIG. 2.

A bond coat 2 having bond structures 4 herein is disposed on a base 1. The structuring in the embodiment illustrated is composed of a three-dimensional mesh structure (see FIG. 4, for example) of which only the cross-sectional faces of three mesh elements (the bond structures 4) are illustrated in the sectional view of FIG. 2.

The bond structures 4 here are configured so as to be integral to the bond coat 2, since the bond coat 2 has been machined by an ablative laser method. This means that the bond structures 4 have been machined from the bond coat 2 such that said bond structures 4 extend vertically from the surface of the bond coat 2. This is referred to as a peak structure since the peaks 6 rise above a base area.

The cross-sectional faces of the bond structures 4 here are configured so as to be substantially triangular, wherein the two lateral faces 5 of the bond structure 4 here are configured so as to be of equal length; a symmetrical shape is present, wherein the axis of symmetry points from the peak 6 perpendicularly towards the base 1.

The angle α at the peak 6 of the bond structure 4 here is approximately 40°. The angle is measured from the peak 6, between the lateral faces 5.

The peak angle in alternative embodiments can be α≤90.

Furthermore, the lateral faces 5 are configured here so as to be straight, that is to say that there are particularly no undercuts.

A ceramic coat 3, for example from YSZ (yttrium-stabilized zirconium oxide) and/or magnesium spinel, is disposed above the bond coat 2.

The bond structure 4 having the inclined lateral faces 5 without undercuts offers a positive connection to the ceramic coat 3, wherein the peaks 6 of the bond structure 4 can ensure a targeted segmentation in the ceramic coat 3.

In the case of the targeted segmentation, cracks 7 are induced in the ceramic coat 3 so as to achieve a mechanical relaxation of tension. Said vertical cracks 7 can be configured in a particularly efficient manner when the bond structure 4 in an undercut-free manner tapers towards the top, that is to say towards the peak 6.

The height H of the bond structure 4, measured from the surface of the bond coat 2, is between 50 and 500 μm; the height H in the embodiment illustrated is approx. 100 μm. The ratio of the height H to the width B at the base of the bond structure 4 (that is to say on the surface of the bond coat 2) here is 1.25. Alternatively, the H-to-B ratio can be in the range between 1 and 10.

Figure 3:
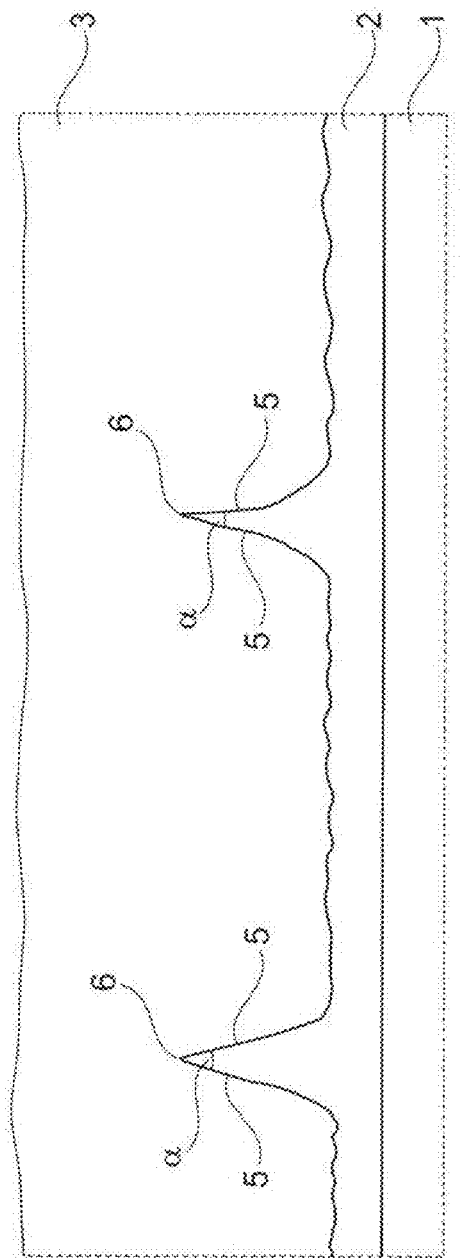
FIG. 3 shows a schematic sectional illustration through a second embodiment of a construction element having a bond structure.

The embodiment according to FIG. 3 represents an alternative to this embodiment so that reference can be made to the relevant description of FIG. 2.

Here too, the width B of the cross section of the bond structure 4 decreases in a monotonous manner from the base on the surface to the bond coat 2 towards the peak 6. However, the lateral walls 5 here are in each case curved towards the inside. However, in both cases the cross sections of the bond structure 4 are symmetrical to the perpendicular line through the peak 6.

It is to be pointed out that the geometric ratios stated here cannot fully mirror the reality in terms of production technology, such as is illustrated by means of the following figures, for example. The numerical values in particular are thus to be understood as mean values, since there are always production-related deviations.

Figure 4:
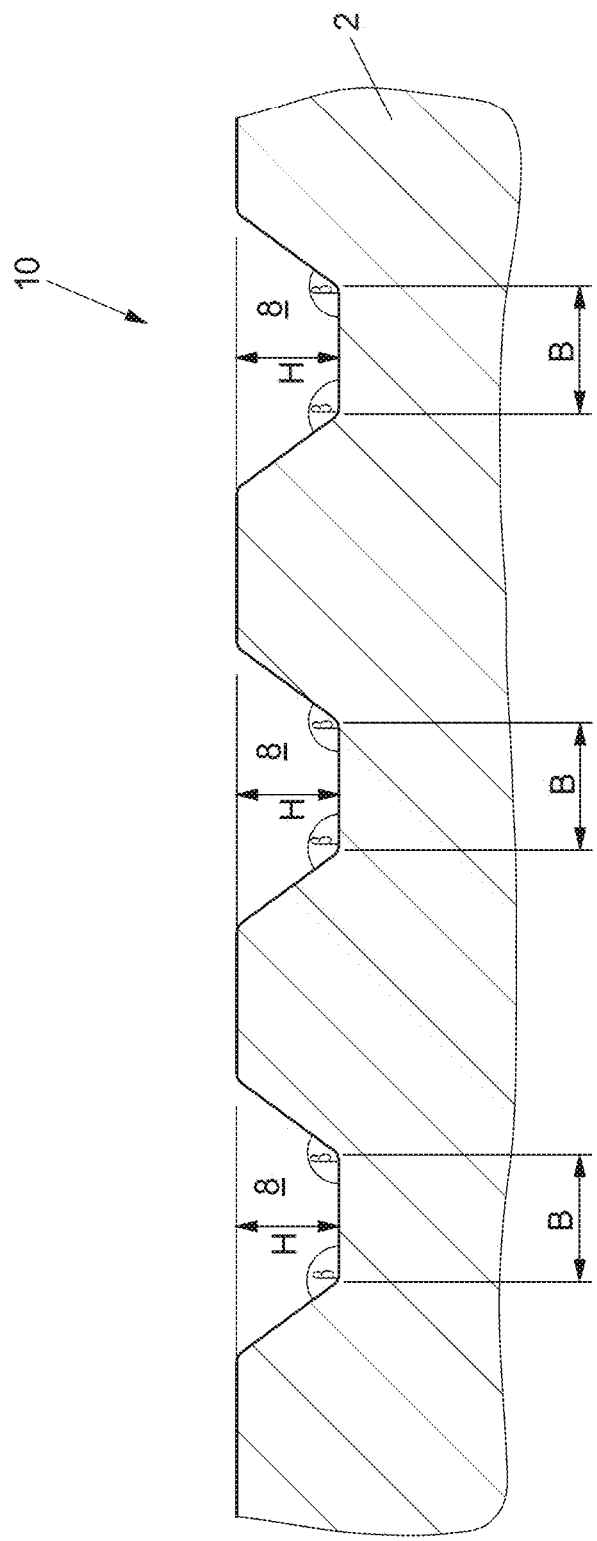
FIG. 4 shows a schematic sectional illustration through a third embodiment of a construction element having a bond structure having a trough structure.

A further embodiment of an undercut-free bond structure is illustrated in FIG. 4, specifically a trough structure, that is to say that individual troughs 8 are incorporated in a base area of the bond coat 2. The troughs 8 have in each case a substantially square or rectangular floor area, wherein the flanks rise from the floor area towards the base area of the bond structure 2. The angle of the flanks in relation to the floor area is the valley angle β of the trough 8. Said valley angle β herein can be between 90 and 170°. A valley angle of β=90° would correspond to vertical walls. In the case of trough structures, the ratio of the height H of the cross section to the width B at the base of the bond structure 4 can also be less than one so that a range between 0.1 and 10 is possible in terms of the ratio.

Figure 5:
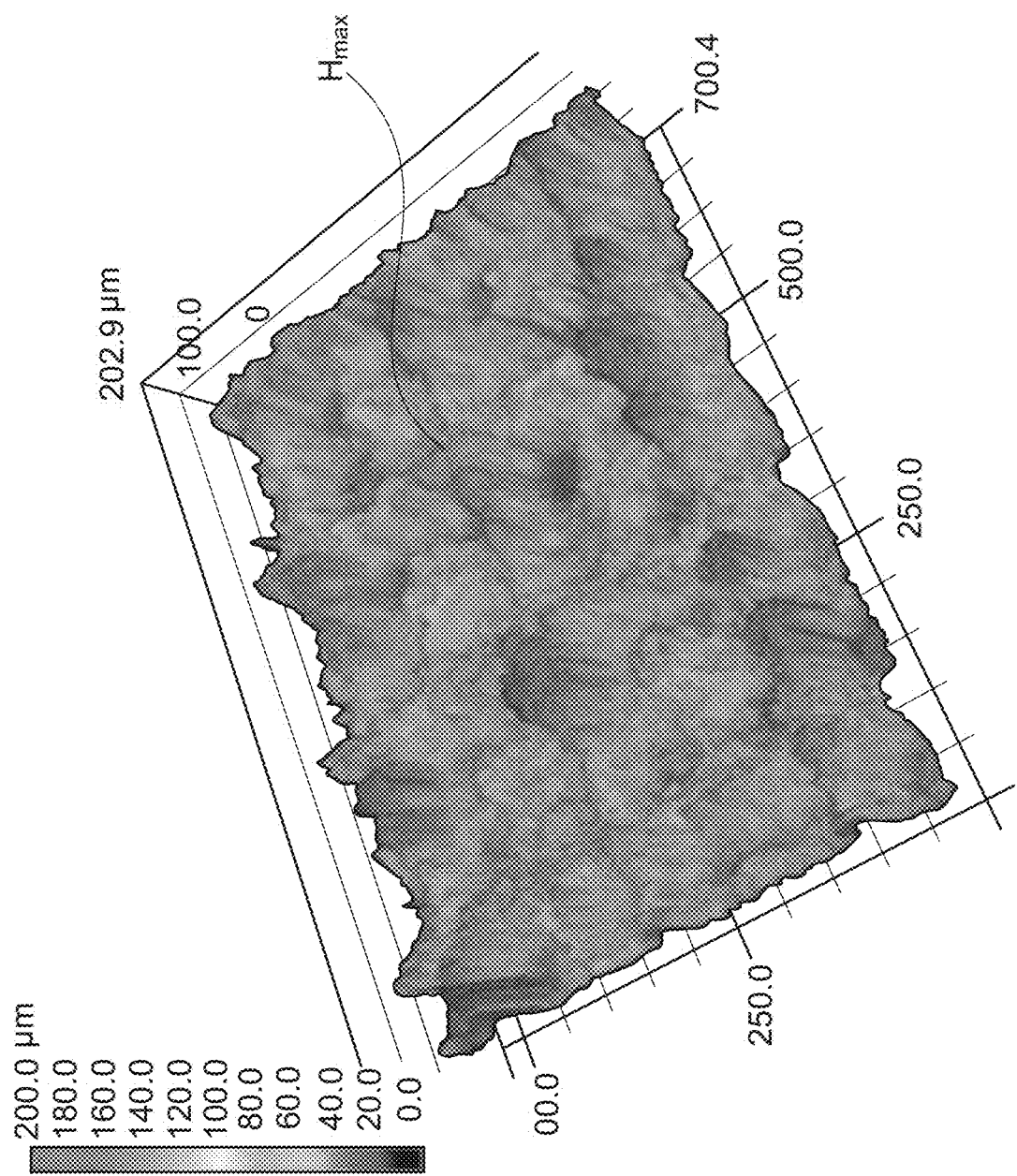
FIG. 5 shows a perspective illustration of a further embodiment of a construction element having a mesh-type bond structure.

A first embodiment for a mesh-type bond structure 4, in which a bond coat 2 from CoNiCrAlY—after being applied to the base not illustrated in FIG. 4—is structured by an ablative laser method is illustrated in FIG. 5 (confocal laser microscope image). A ceramic coating 2 from YSZ and magnesium spinel is applied to the bond coat 2 by an atmospheric plasma spray method.

Some of the parameters of the laser ablation method for the production of the bond structure are listed below:
  laser output: in the kW range at peak output (the examples illustrated have been generated by a Trumph TruMark 5020 Laser (Nd:YAG) at a wavelength of 1062 nm);
  pulse length in the range of 100 nanoseconds;
  frequency of a few 100 kHz, in particular a few 10 kHz;
  beam diameter (a few 10 μm);
  number of the sequential pulses in the range from 2 to 10;
  incorporating the bond structures by way of a meandering program.

The bond structures 4 here are configured as a mesh in which the mesh lines intersect one another in a substantially orthogonal manner. The lateral lengths of the mesh cells are substantially identical so that a square structural pattern is created. The maximum height Hmax of the cross section of the bond structure 4 at the crossover points of the mesh lines of the bond structure 4 is greater than the height H of the bond structure 4 outside the crossover points. The height H of the mesh structure 4 is substantially consistent between the crossover points.

Figure 6:
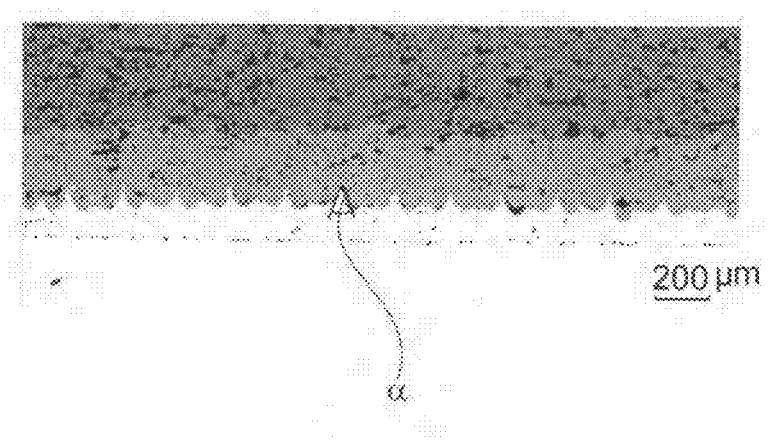
FIG. 6 shows a microscopic sectional view of the embodiment from FIG. 5, having a mesh-type bond structure.

The deviations from the idealized illustration of FIGS. 2 and 3 become evident in the high-resolution illustration of FIG. 5. However, it can be seen that the bond structure 4 in the cross section is without undercuts, and the peak angle α is less than 90°. This can likewise be clearly seen in the sectional image of FIG. 6 (SEM picture). The section plane here is perpendicular to the mesh lines. The peak angle α of the bond structure 4 is plotted at one location.

Figure 7:
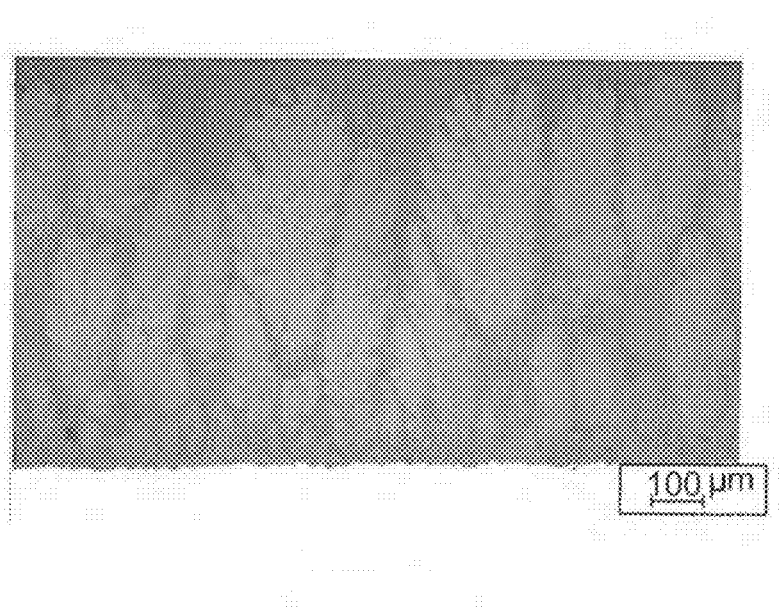
FIG. 7 shows a microscopic sectional view of a further embodiment of a construction element.

A SEM sectional picture through another embodiment of a construction element 10 is illustrated in FIG. 7. Only the SPS-Mg-spinel coat is illustrated herein.

Here too, a bond coat 2 from CoNiCrAlY is machined by an ablative laser method in order to generate an undercut-free bond structure 4 which has a mean peak angle of less than 90°.

A YSZ coat is applied to the bond coat 2 by an atmospheric plasma spray method. A magnesium-spinel coat which already has a specific degree of segmentation is then applied by a suspension plasma spray method (SPS). The ceramic coat 3 here thus comprises two layers from different materials.

The use of an ablative laser method for structuring is favourable in economic terms. It is also not necessary for complex peak structures to be shaped.

Different bond structures 4 are illustrated in FIGS. 8A to 8F. The bond structures 4 are particularly intended for preventing the ceramic high-temperature coating 3 from flaking in large areas. Also, cracks in the high-temperature coating 3 cannot extend in an arbitrary manner in the horizontal direction. The bond structures 4 here in can cross one another or be disposed so as to be mutually parallel.

Figure 8A:
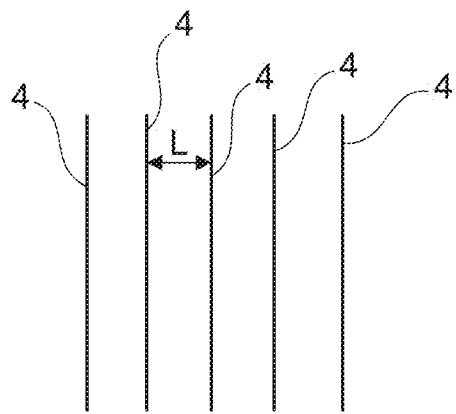
FIG. 8A-F show schematic plan views of bond structures on a construction element.

A bond structure 4 which is formed from parallel linear elements is illustrated in FIG. 8A. The spacing L between the peaks 6 herein is between 500 and 5000 μm. However, bond structures 4 do not mandatorily have to comprise only linear elements.

Figure 8B:
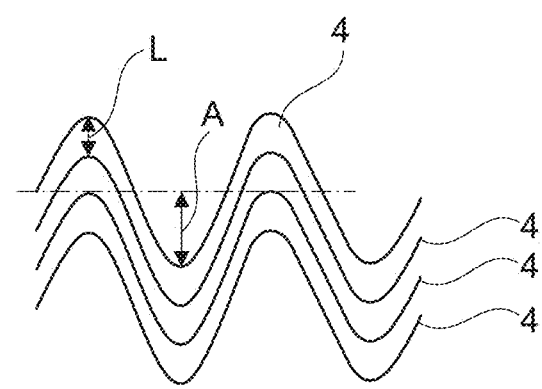

A corrugated bond structure 4 from curved elements that lie so as to be mutually parallel is illustrated in FIG. 8B. Here too, the spacing L between the elements is between 500 and 5000 μm. A propagation of cracks can be particularly effectively suppressed in the case of an amplitude of the corrugated structure which is greater than the spacing L between the structural elements.

Figure 8C:
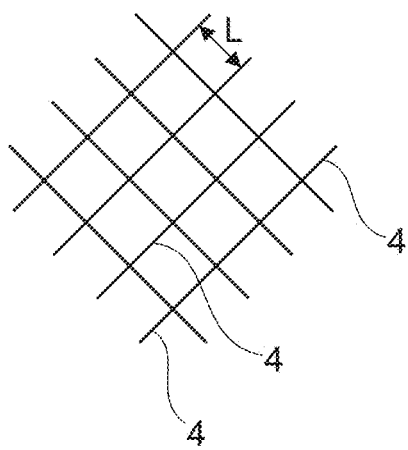

An embodiment in which the elements intersect one another is illustrated in FIG. 8C. A mesh structure as is illustrated in FIG. 5, for example, is created, wherein the spacing L between the parallel elements (that is to say between the peaks) is between 500 and 5000 µm.

Figure 8D:
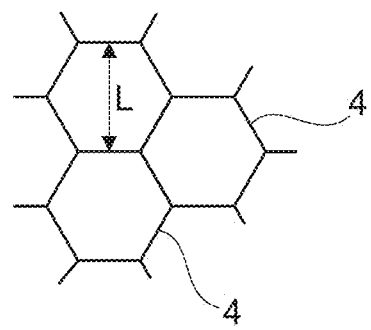

A honeycomb-shaped pattern which is constructed from linear elements is illustrated in FIG. 8D. The spacing L between two parallel elements is between 500 and 5000 µm.

Figure 8E:
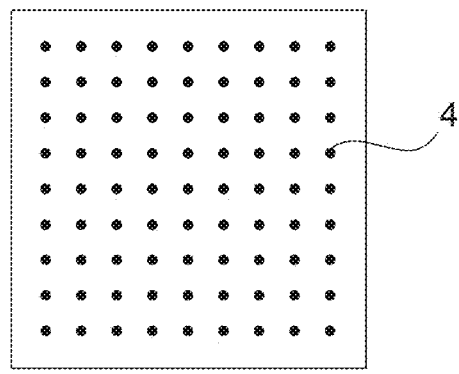
Figure 8F:
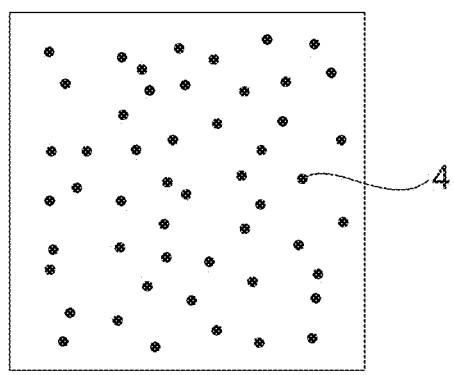

A punctiform pattern such as is present in a peak pattern, for example, is illustrated in FIG. 8E. The peak pattern herein can readily be configured so as to be regular, as is illustrated in FIG. 8E, or else random, as in FIG. 8F.

In principle, it is possible for a plurality of differently shaped undercut-free bond structures 4 and/or else patterns to be disposed on a construction element 10. The spacing L in a pattern can thus particularly be varied so as to ensure an optimal adaptation of the component 10 to thermal loads.

In principle, it is also possible for the patterns, for example the patterns illustrated in FIGS. 8A to 8E, to be combined with one another.

LIST OF REFERENCE SIGNS

1 Base
2 Bond coat
3 Ceramic coat
4 Bond structure of the bond coat
5 Lateral faces of the bond structure
6 Peak of the cross section of a peak structure
7 Crack in the ceramic coat
8 Trough of a trough structure
10 Construction element
20 Aircraft engine (turbo engine)
21 Combustion chamber
22 High-pressure stage of a turbine
23 Liner
α Peak angle in the cross section of a peak structure of the bond structure
β Valley angle in the cross section of a trough structure of the bond structure
B Width of the cross section of the bond structure
H Height of the cross section of the bond structure
Hmax Height of the cross section of the bond structure at crossover points
L Spacing between peaks of a bond structure

The invention claimed is:

1. A construction element, adapted and configured for use in an aircraft engine, comprising:
    a base structure;
    a bond coat attached to and positioned above the base structure, the bond coat including a bond structure, the bond structure including a structured surface including at least one chosen from peak structures and trough structures, the at least one chosen from the peak structures and the trough structures including lateral faces;
    a ceramic coat attached to and positioned above the bond structure;
    the lateral faces of the bond structure, in cross section, being configured so as to be free of undercuts,
    wherein, the bond structure includes peak structures and peaks of the peak structures have, in cross-section, mean peak angles (α) of less than 45°, the peak structures ensuring a targeted segmentation in the ceramic coat,
    wherein, when the bond structure includes trough structures, angles (β) of the flanks relative to bottom surfaces of the trough structures are in a range of 90°≤β<170°;
    the ceramic coat including an oxidic ceramic containing a magnesium spinel, and
    wherein the bond structure comprises a proportion of at least one chosen from:
    M CrAlY where M=Fe, Ni, and/or Co
    M CrAl where M=Fe, Ni, and/or Co
    NiAl, or NiAlPt,
    yttrium-stabilized zirconium oxide (YSZ),
    aluminates,
    pyrochlores, and
    perovskite.

2. The construction element according to claim 1, wherein a ratio of a thickness of the bond coat to a height of the bond structure is in a range from 0.1 to 10.

3. The construction element according to claim 1, wherein a ratio of a height of the bond structures to a spacing of the at least one chosen from the peak structures and the trough structures is in a range from 0.1 to 5.

4. The construction element according to claim 1, wherein a roughness Ra of the structured surface is 5 µm to 25 µm.

5. The construction element according to claim 1, wherein the bond structure is configured as at least one chosen from a linear structure, a punctiform structure, a mesh structure, a honeycomb structure, a corrugated structure from mutually parallel-running corrugations, and from superimpositions of these structures.

6. The construction element according to claim 5, wherein, when the bond structure is configured as a mesh structure, a maximum height of a cross section of the bond structure at crossover points of the bond structure, varies in relation to a height of the bond structure outside the crossover points.

7. The construction element according to claim 1, wherein a mean spacing between peak structures of the bond structure is between 50 and 5000 µm.

8. The construction element according to claim 1, wherein the at least one chosen from the peak structures and the trough structures includes a triangular cross section.

9. The construction element according to claim 1, wherein widths of the cross-sections of the peak structures decreases uniformly from bases of the peak structures to peaks of the peak structures.

10. The construction element according to claim 1, wherein the cross section of the bond structure is symmetrical to at least one chosen from a perpendicular line through one of the peak structures and a vertical central axis of one of the trough structures.

11. The construction element according to claim 1, wherein, a ratio of heights to widths at bases of the at least one chosen from the peak structures and the trough structures is between 0.1 and 10.

12. The construction element according to claim 1, wherein a height of a cross section of the bond structure is between 50 and 500 µm.

13. The construction element according to claim 1, wherein a height of an upper base surface of the bond structure is constant.

14. The construction element according to claim 1, wherein the ceramic coat further includes at least one chosen from an aluminum oxide, a yttrium-stabilized zirconium oxide (YSZ), pyrochlores, and perovskites.

15. A method for production of a construction element for a turbo engine, comprising:

providing a construction element, adapted and configured for use in the turbo engine, wherein the construction element includes:
- a base structure;
- a bond coat attached to and positioned above the base structure, the bond coat including a bond structure, the bond structure including a structured surface including at least one chosen from peak structures and trough structures, the at least one chosen from the peak structures and the trough structures including lateral faces;
- a ceramic coat attached to and positioned above the bond structure;
- the lateral faces of the bond structure, in cross section, being configured so as to be free of undercuts,
- wherein, the bond structure includes peak structures and peaks of the peak structures have, in cross-section, mean peak angles ($\alpha$) of less than 45°, the peak structures ensuring a targeted segmentation in the ceramic coat,
- wherein, when the bond structure includes trough structures, angles ($\beta$) of the flanks relative to bottom surfaces of the trough structures are in a range of $90° \leq \beta < 170°$;
- the ceramic coat including an oxidic ceramic containing a magnesium spinel;

wherein the bond coat is applied to the base structure and the ceramic coat is disposed on the base structure;

wherein the bond structure of the bond coat is generated by a laser ablation method, and wherein the bond structure comprises a proportion of at least one chosen from:

M CrAlY where M=Fe, Ni, and/or Co
M CrAl where M=Fe, Ni, and/or Co
NiAl, or NiAlPt, yttrium-stabilized zirconium oxide (YSZ),
aluminates,
pyrochlores, and
perovskite.

16. The method according to claim 15, and further comprising applying the ceramic coat by an atmospheric plasma spray method.

17. The method according to claim 15, and further comprising applying a YSZ coat to the bond coat by an atmospheric plasma spray method, and applying the ceramic coat including the magnesium spinel over the YSZ coat by a suspension plasma spray method.

18. The aircraft engine comprising the construction element according to claim 1, wherein the construction element is at least one chosen from a configured as part of a combustion chamber, configured as a part of a wall of a turbine, and configured in an intake region of a high-pressure part of the turbine.

19. The construction element according to claim 1, and further comprising at least one chosen from:
- wherein a ratio of a thickness of the bond coat to a height of the bond structure is in a range from 0.3 and 3;
- wherein a ratio of the height of the bond structure to a spacing of the at least one chosen from the peak structures and the trough structures is in a range from 0.3 and 3;
- wherein the at least one chosen from the peak structures and the trough structures includes an isosceles triangular cross section;
- wherein, a ratio of heights to widths at bases of the at least one chosen from the peak structures and the trough structures is between 1 and 5;
- wherein a height of a cross section of the bond structure is between 70 and 150 µm.

* * * * *